(12) United States Patent
Fukui et al.

(10) Patent No.: US 8,000,463 B2
(45) Date of Patent: Aug. 16, 2011

(54) TELEPHONE SYSTEM

(75) Inventors: Hiroaki Fukui, Fuchu (JP); Koichi Suzuki, Nishitokyo (JP); Hiroyuki Watanabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1130 days.

(21) Appl. No.: 11/707,006

(22) Filed: Feb. 16, 2007

(65) Prior Publication Data

US 2007/0201670 A1    Aug. 30, 2007

(30) Foreign Application Priority Data

Feb. 16, 2006 (JP) .................. 2006-039887

(51) Int. Cl.
*H04M 7/00* (2006.01)
*H04L 12/66* (2006.01)

(52) U.S. Cl. ............... 379/220.01; 379/219; 370/352

(58) Field of Classification Search ............. 379/220.01, 379/219; 705/76; 726/15, 17, 2, 4, 14; 713/156; 370/352

See application file for complete search history.

(56) References Cited

U.S. PATENT DOCUMENTS

| 7,562,386 B2 * | 7/2009 | Balissat et al. ............ 726/15 |
| 2005/0144144 A1 * | 6/2005 | Graff ............ 705/76 |
| 2005/0149724 A1 * | 7/2005 | Graff ............ 713/156 |

FOREIGN PATENT DOCUMENTS

| JP | 2000-286897 | 10/2000 |
| JP | 2003-153315 | 5/2003 |
| JP | 2003-284144 | 10/2003 |
| JP | 2004-32319 | 1/2004 |
| JP | 2004-072546 | 3/2004 |
| JP | 2004-222009 | 8/2004 |
| JP | 2004-297591 | 10/2004 |
| JP | 2005-057331 | 3/2005 |
| JP | 2005-236917 | 9/2005 |

OTHER PUBLICATIONS

Notification of Reasons for Rejection for Application No. 2006-039887, Japanese Patent Office, mailed Jul. 8, 2008.
VoIP Gateway having a PBX Function, Making it Possible to Construct a Private Line Network by an IP Telephone Set, Nikkei Business Publications, Mar. 20, 2000, p. 180.

* cited by examiner

*Primary Examiner* — Thjuan K Addy
(74) *Attorney, Agent, or Firm* — Finnegan, Henderson, Farabow, Garrett & Dunner, L.L.P.

(57) ABSTRACT

A telephone system comprising a first phone terminal belonging to private communication network, a second phone terminal belonging to public communication network, a transit device connects the private communication network to the public communication network, and a call control device controls a call between the first phone terminal and the second phone terminal, wherein the private communication network includes, a certification processing unit performs certification processing to certificate whether or not the first phone terminal should be connected to the public communication network, and a notification processing unit notifies the result of the certification processing to the call control device when a call connection request to form a communication link between the first phone terminal and the second phone terminal occurs, and the call control device forms the communication link in response to the call connection request if the notified result of the certification processing shows a success.

12 Claims, 15 Drawing Sheets

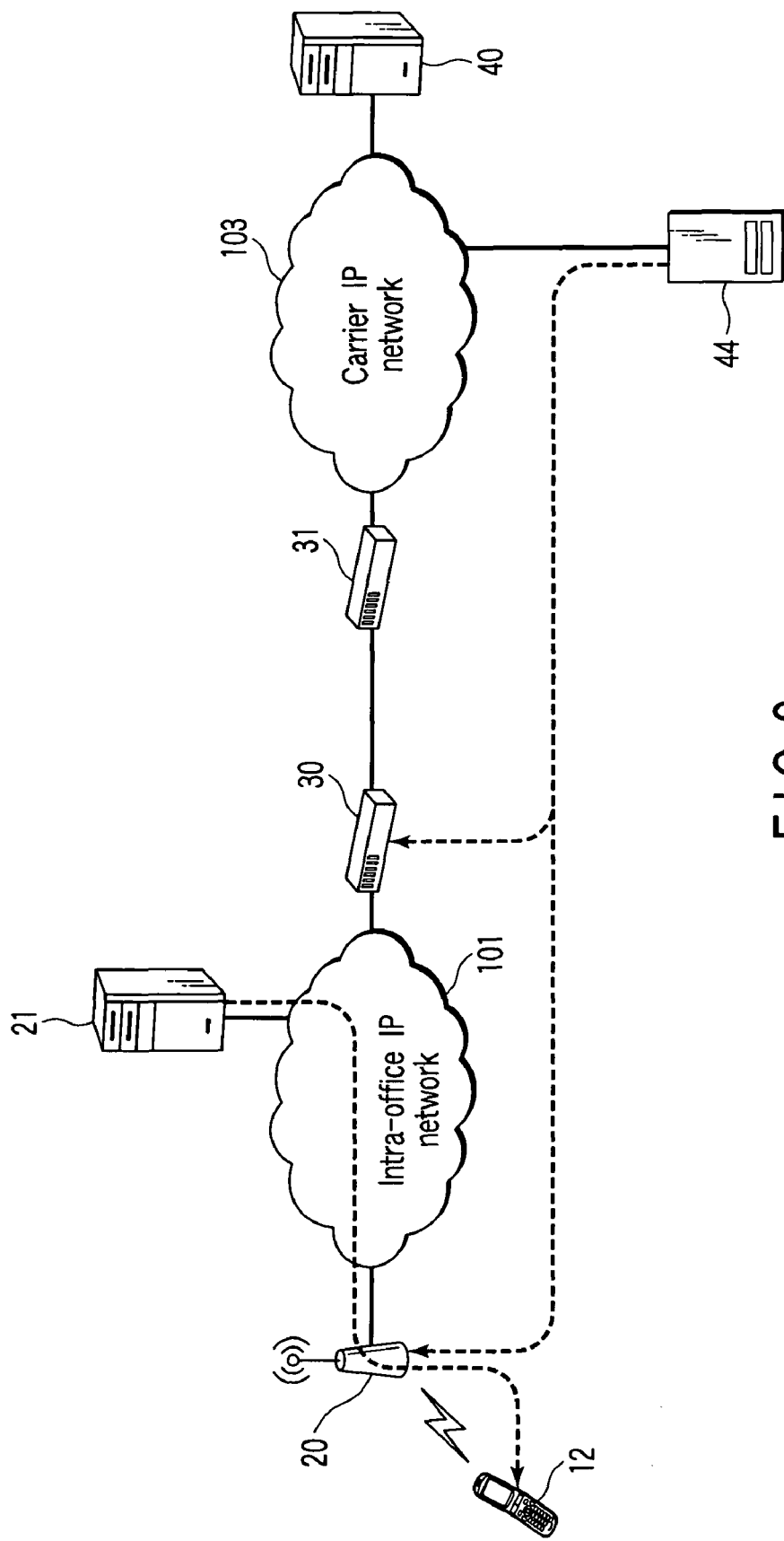
F I G. 2

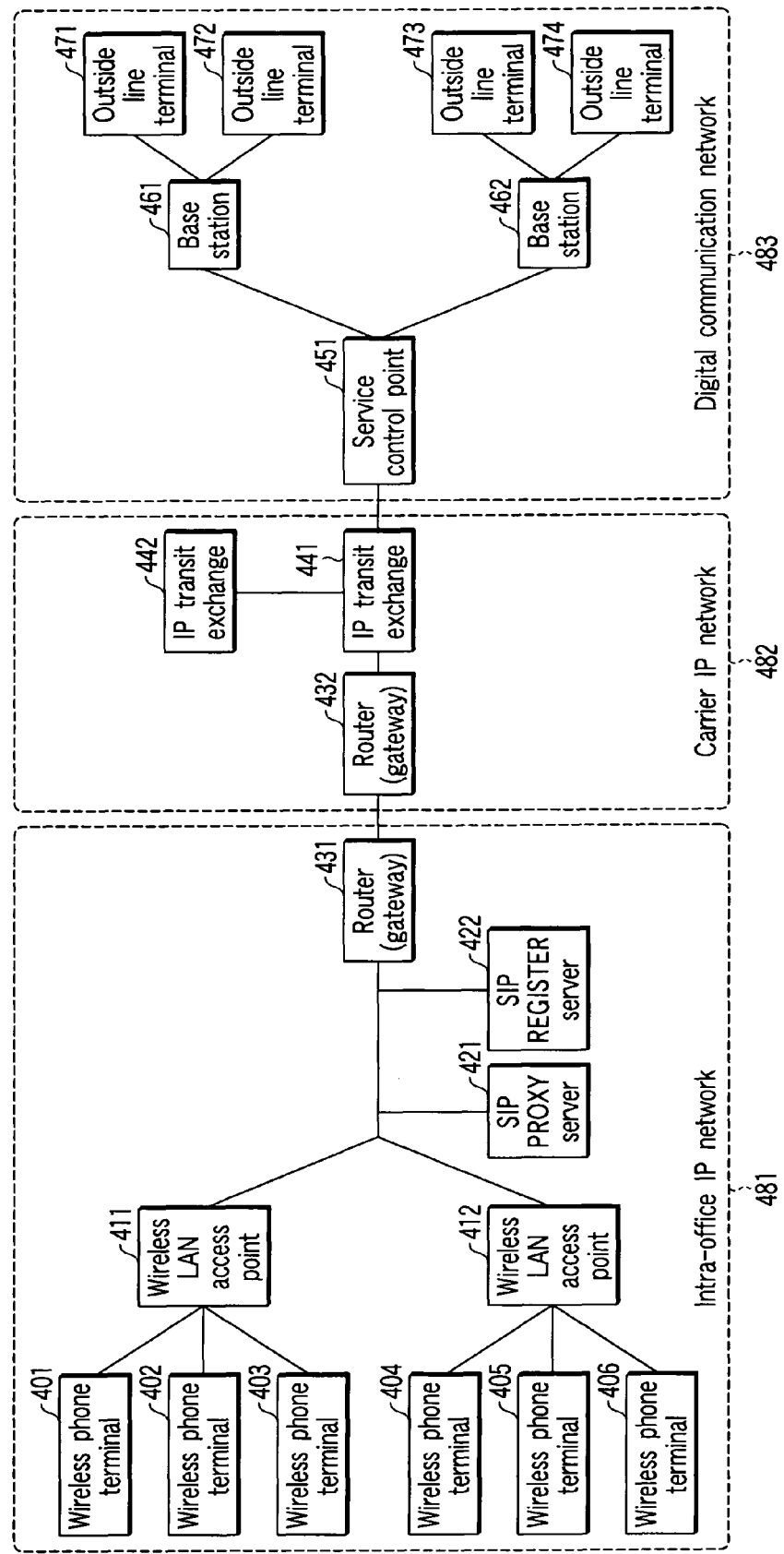
F I G. 4

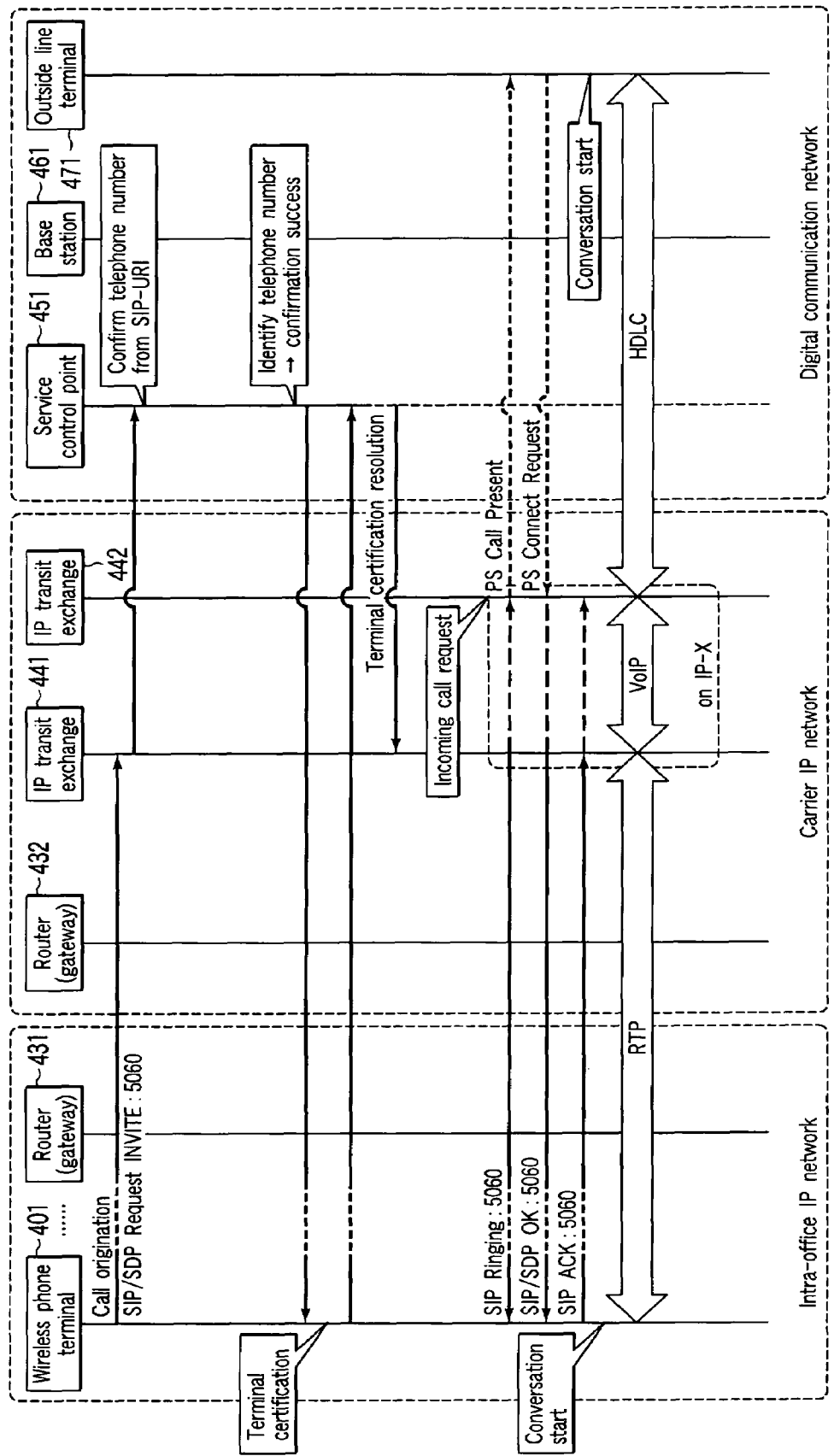
F I G. 11

TELEPHONE SYSTEM

CROSS-REFERENCE TO RELATED APPLICATIONS

This application is based upon and claims the benefit of priority from prior Japanese Patent Application No. 2006-039887, filed Feb. 16, 2006, the entire contents of which are incorporated herein by reference.

BACKGROUND OF THE INVENTION

1. Field of the Invention

The present invention relates to a telephone system providing a voice communication service by the use of an Internet protocol (IP) telephone terminal to make communication using the IP.

2. Description of the Related Art

In recent years, a voice communication system, which is called a voice over Internet protocol (VoIP) and uses an IP network, has begun to be widely used. Such a system of this type is mainly used for extension communication in an office, etc. Utilizing the VoIP for the extension conversation enables accomplishing a cost reduction due to the use of the IP network and multi-functionality such as cooperation with a personal computer. Further, an IP telephone terminal (Wi-Fi phone) which utilizes not only a wired network but also a wireless LAN to mount a session initiation protocol (SIP) thereon has been shipped to the market.

On the other hand, also in a public switched telephone network that is an outside line (external line), not only conventional data communication but also a service form to achieve voice communication on the IP network has increased. It goes same for a mobile phone terminal using a CDMA/GSM system, etc. Nowadays, a dual terminal, having both functions of a mobile phone in the CDMA/GSM system and a wireless IP telephone set, has been sold.

However, to use such a type of terminal, an existing technique enables only the communication through the same carrier. That is, the terminals, using the identical carriers, for example, mobile phones, simple-type mobile phones (personal handy phones [PHSs], etc.), and IP phone terminals can mutually make a telephone call usually. Therefore, to establish the communication between the external phone terminal and the IP phone terminal, expansion of functions of the voice communication system becomes necessary.

Jpn. Pat. Appln KOKAI Publication No. 2004-32319 discloses a proposal to decrease modification on a side of a mobile phone line network required so as to utilize the mobile phone line network via the IP network. This reference discloses a technique in which a proxy terminal on a side of a public switched telephone line network operates the data according to the protocol in the line network.

Another reference, Jpn. Pat. Appln. KOKAI publication No. 2004-297591, discloses an apparatus and a method for seamlessly switching both line switching voice communication and VoIP voice communication. However, the content described in this reference only shows a mobile communication terminal device, and it does not describe about a system for proving the communication service itself between the IP phone terminal and the line telephone terminal.

The existing technique requires to manage information on subscriber's numbers and IP addresses on the side of the line network and to modify the side thereof so as to enable both line switched voice communication and the VoIP voice communication. The line network having a physical interface such as a signal line, the scale of the modification frequently becomes large and difficult. A specification change such as additions of control items frequently occurs after the modification. This modification is difficult similarly.

On the existing public switched telephone line network, for contracting and charging by a carrier, such processing as terminal certification (authentication) to ensure whether or not a user of a terminal is a true subscriber and measurement of duration of call for each subscriber, have been performed. Terminals not to be charged, such as IP phone terminals for internal communication optionally set by an office and a computer with IP communication software installed therein, are connected to the IP network. Therefore, it is hard for contracting and charging to apply the existing technique to the IP telephone terminal.

An object of the present invention is to provide a telephone system enabling the communication between the IP phone terminal and the outside line phone terminal without having to implement large-scale modification.

BRIEF SUMMARY OF THE INVENTION

According to an aspect of the present invention, there is provided a telephone system, comprising a first phone terminal belonging to a private communication network; a second phone terminal belonging to a public communication network; a transit device which connects the private communication network to the public communication network; and a call control device which controls a call between the first phone terminal and the second phone terminal, wherein the private communication network includes; a certification processing unit which performs certification processing to certificate whether or not the first phone terminal should be connected to the public communication network; and a notification processing unit which notifies the result of the certification processing to the call control device when a call connection request to form a communication link between the first phone terminal and the second phone terminal occurs, and the call control device forms the communication link in response to the call connection request if the notified result of the certification processing shows a success.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exemplary view depicting a mutual relationship among certification objects in an embodiment of the invention;

FIG. 4 is an exemplary schematic view depicting a network configuration in the first embodiment of the invention.

FIG. 11 is an exemplary sequence view depicting a transit method in which IP transit exchanges mutually treat voice data of end-to-end in a second embodiment of the invention;

DETAILED DESCRIPTION OF THE INVENTION

Figure 1:
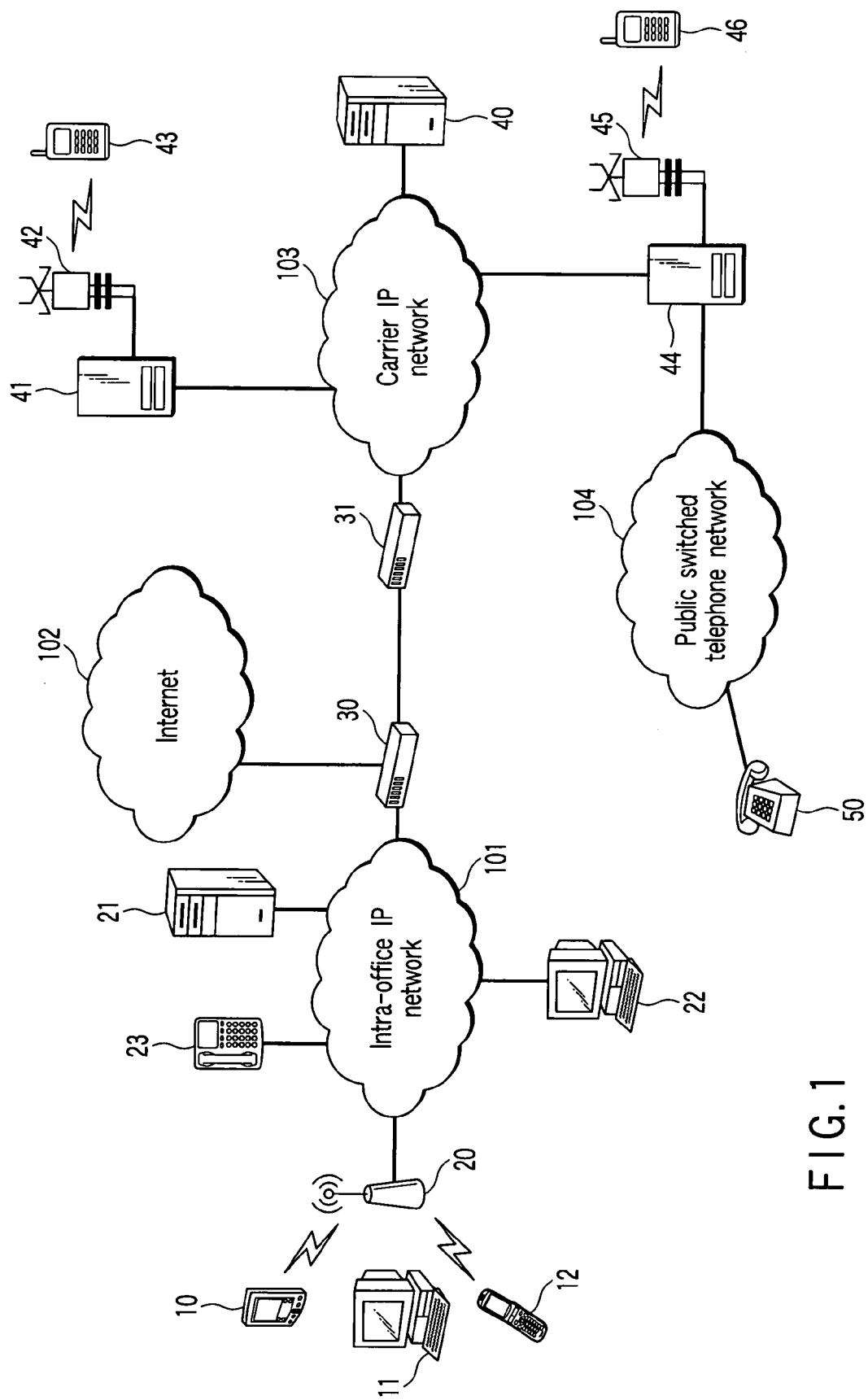
FIG. 1 is an exemplary view depicting a telephone system regarding the invention.

FIG. 1 is a view showing a telephone system regarding the present invention. FIG. 1 shows an existing system configuration from a point of view in which a telephone system is configured by connecting an intra-office IP network to a carrier IP network. One of advantages of the invention is to enable the existing system configuration as it is. A PDA terminal 10, a soft phone on a personal computer (PC) 11, and a mobile IP terminal 12 respectively have telephone functions, and they are wirelessly connected to an intra-office IP network 101 through an access point 20. The soft phone is a computer with IP communication software installed therein.

In the intra-office IP network 101, a soft phone 22 on the PC, and an IP phone terminal 23 respectively having telephone functions in a similar manner are wirelessly connected to a certification server 21 of the intra-office IP network 101 through a router and a hub (not shown). The intra-office IP network 101 is connected to the Internet 102 via a router 30 that is a gateway, and further connected to a carrier IP network 103 managing telephone communication via a router 31 that is another gateway.

The carrier IP network 103 has a network providing telephone communication via IP transit exchanges 41, 44 in addition to an intra-office IP network. The certification processing on the network providing the telephone communication is conducted by a functional object, such as a certification server 40 or an IP transit exchange 44 on the carrier IP network 103, placed the network to bear the certification processing. Mobile phones 43 and 46 are connected to the carrier IP network 103 through base stations 42 and 45 that are the nearest base stations, respectively. The IP transit exchange 44 is also connected to a public switched telephone network 104 in addition to the base station 45. Thereby, a fixed telephone 50 belonging to the public switched telephone network 104 is connected to the IP transit exchange 44.

The carrier IP network 103 and the intra-office IP network 101 that is its customer are connected with each other by an exclusive line between the routers 30 and 31. In addition, if the problem such that a conflict of network segments and network address translation (NAT) override can be avoided, both the carrier IP network 103 and the intra-office IP network 101 may be connected with each other via the Internet 102 not via the exclusive line.

First Embodiment

A first embodiment of the invention will mention a basic configuration and certification processing in which the mobile IP terminal belonging to the intra-office IP network and the wireless-phone terminal belonging to the carrier network mutually make telephone calls.

Telephone calls by a mobile phone have needed the terminal certification, up to now, on a caller side and a call reception side. The terminal certification utilizes a PS-ID that is identification information uniquely assigned to the terminal. The carrier side checks the PS-ID to the subscriber's number (contractor's number) to determine whether or not the telephone call between the caller side and the call reception side. If the determination result shows, for example, the contractor at the call reception side has not paid communication fee yet, an announcement such as "The number you have dialed is not currently in use." is made.

Meanwhile, using a MAC address that is a unique identification number in a TCP/IP network is a possible approach instead of the PS-ID when the carrier manages the IP phone terminal. However, the carrier cannot manage so far as any IP phone terminal used arbitrarily. Therefore, it is very difficult for the carrier to determine whether or not the equipment having its own MAC address is the terminal being used by the contractor.

If it becomes possible for the carrier to manage all the terminals being used, a demerit, which makes an end user unable to perform so-called "type change" such that the user freely selects and changes the IP phone terminal, occurs conversely.

Therefore, in this first embodiment, the object to be certificated through the IP transit by the carrier is not set the IP phone terminal itself used by the end user, but the carrier set its object to the access point or the router placed at the transit point on the network.

FIG. 2 is a view showing a mutual relationship among certification objects in the first embodiment. FIG. 2 illustrates the relationship between the certification by the carrier and that by a representative in an office. Not the carrier but each office which has made a contract with the carrier appropriately performs the certification of a mobile IP terminal 12 itself accommodated under an access point 20.

Certification in the office may utilize the MAC address, and other than this, it also may utilize the unique identification number. The office makes a customer contract with the carrier and arranges the access point 20 or the router 30 that is the certification object of the carrier inside the intra-office network. The contract between the office and the carrier being made only depending on a method for collecting charge by the duration of call and the number of lines (telephone numbers) possible to make external telephone calls, the problem such that it becomes impossible to discriminate the terminal or change the type of the terminal does not occur. The carrier certificates the access point 20 or the router 30 by use of the certification means disposed in the IP transit exchange 44. The result of the certification is managed by the certification server 40 on the carrier IP network 103.

Figure 3:
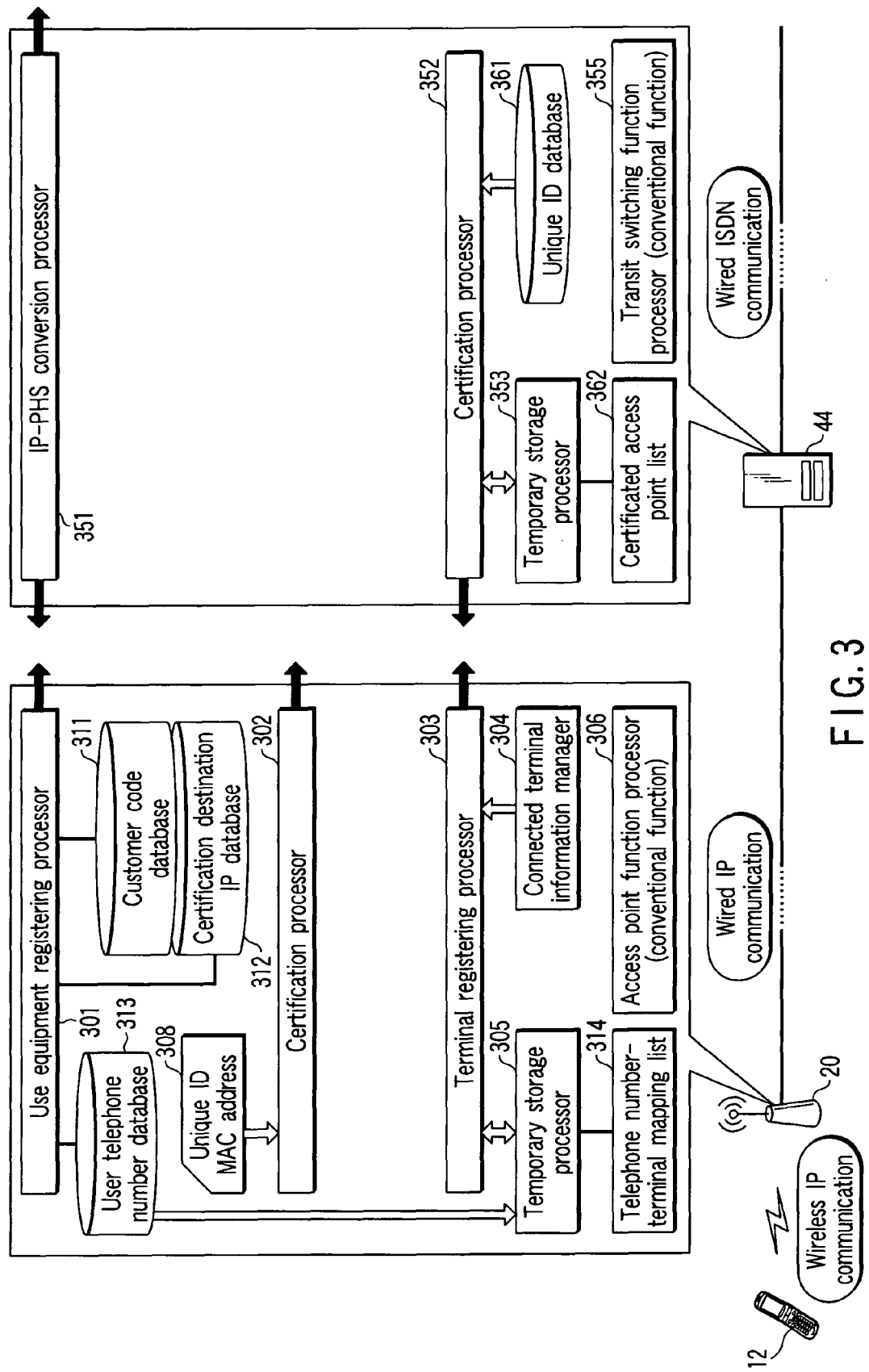
FIG. 3 is an exemplary block diagram depicting an access point and a transit exchange in a first embodiment of the invention.

FIG. 3 is a functional block diagram showing the access point and the transit exchange in the first embodiment. In addition to known access point function processor 306 and transit switching function module 355, in the first embodiment 1, other processing units shown in FIG. 3 are added.

The access point 20 in the first embodiment comprises the access point function processor 306 for a wireless LAN pursuant to each type of standards such as IEEE 802.11 a|b|g. In addition to this, the access point 20 includes an equipment registering processor 301, a certification processor 302, a terminal registering processor 303, a connected terminal information manager 304, a temporary storing module 305, a customer code data base 311, a certification destination IP data base 312, a use telephone number data base 313, and a telephone number-customer terminal mapping list 314. The certification processor 302 uses MAC address 308 as a unique identification number.

The equipment registering processor 301 registers equipment to be used to the carrier. The terminal registering processor 303 conducts terminal registration processing between the access point 20 and the mobile IP terminal 12. The connected terminal information manager 304 manages the terminal connected to the access point 20 regardless of the result of the certification. The database 313 is a database for the telephone number registered by the equipment registering processor 301.

In these components, particularly, the certification processor 302 conducts certification processing to ensure whether or not the mobile IP terminal 12 may be connected to the carrier IP network 103 and the public switched telephone network 104. When call connection requests to establish communication links among the mobile IP terminal 12 and other phone terminals 43 and 46 occur, the certification processor 302 notifies the result of the certification processing to the IP transit exchange 41, 44 and the certification server 40.

The IP transit exchange 44 has a known transit switching function processor 355 mounting the SIP that is the standard of the VoIP, and transiting between the IP network and the public switched telephone network. Additionally, the IP transit exchange 44 includes an protocol changer 351, a certification processor 352, a temporary storing processor 353, a unique ID database 361, and a certificated access point list 362. Each database is stored in a non-volatile storage device such as a flash ROM, and each list is stored in a temporary storage device such as a RAM.

If the result of the certification processing notified from the access point 20 shows a success, the IP transit exchange 44 forms the communication link regarding the mobile IP terminal 12 in response to the call connection requests. The certification processor 352 and the transit switching function processor 355 conduct the link formation processing.

The IP transit exchange 44 has a function to convert mutual protocols between the carrier IP network 103 and the public switched telephone network 104 and makes the transit of voice communication therebetween. This function is mainly performed by the protocol changer 351.

FIG. 4 is a schematic view illustrating one example of the network configuration in the first embodiment. FIG. 4 depicts principal equipment composing the network and its connection relationship, and equipment not shown exists sometimes.

An intra-office IP network 481 and a carrier IP network 482 are connected with each other through routers 431 and 432 that are gateways. The carrier IP network 482 is further connected to a digital communication network 483 through an IP transit exchange 441 mutually converting protocols between the intra-office IP network 481 and the public switched telephone network 104. The IP transit exchange 441 is connected to an IP transit exchange 442 accommodating a carrier IP network differing from the carrier IP network 482.

In the intra-office IP network 481, mobile IP terminals 401 to 406 are connected to the network via the access points 411 to 412. Further, an SIP PROXY server 421 and an SIP REGISTER server 422 are connected to the intra-office IP network 408.

Next, a procedure until a telephone call is started in the first embodiment will be described. The public switched telephone network and the IP network respectively require different procedures before starting the voice communication. Installing a certification processing function to the IP transit exchange absorbs this difference, in other words, makes the difference non-influential on an upper layer in the telephone system. Thereby, it becomes possible to make mutual telephone calls among terminals using different protocols overriding the public switched telephone network and the IP network.

The procedures until the telephone call is started being so complicated, the procedure will be described by dividing it into four main stages on the basis of the characteristics of the equipment.

A first procedure is for pre-registration-setting of access points.

A second procedure is certification processing of the access points to the IP transit exchange.

A third procedure is connection processing of the mobile IP terminals to the access points.

A fourth procedure is terminal certification processing performed by the access points on behalf of the mobile IP terminals to the IP transit exchange.

Next, each procedure will be explained in detail.

<First Procedure>

In the first procedure, the IP transit exchange performs pre-registration on the carrier side to the access points that are the network equipment. The pre-registration is implemented by the equipment registering processor 301 and the acquired information is stored in the code database 311, the certification destination IP database 312, and the use telephone number database 313.

Figure 5:
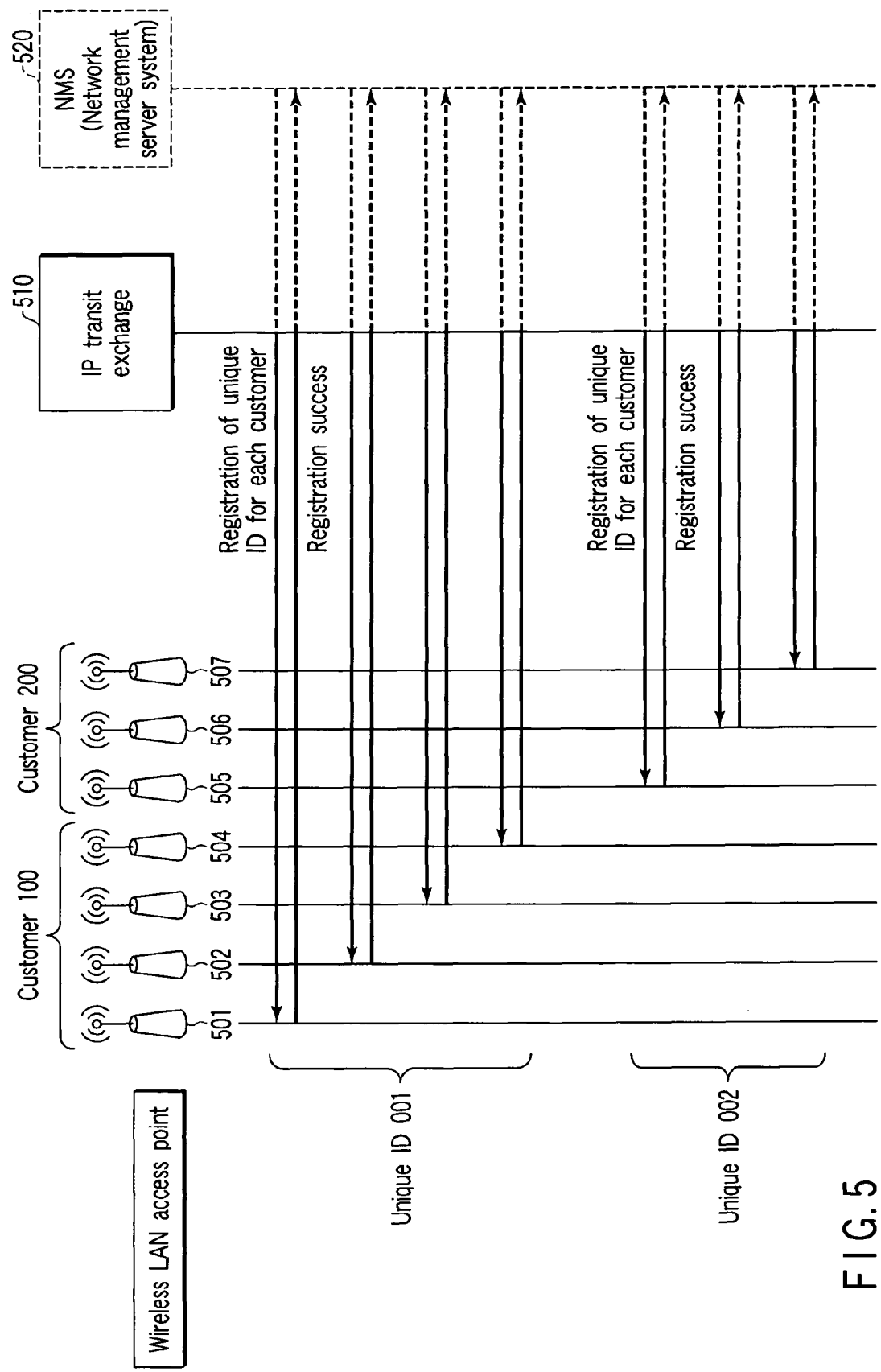
FIG. 5 is an exemplary sequence view depicting a first procedure in the first embodiment of the invention.

FIG. 5 is a sequence view showing the first procedure. In FIG. 5, it is supposed that two customers differing in the view point from the carrier are present on the same IP network. Among of two customers, a customer 100 utilizes access points 501 to 504, and a customer 200 utilizes access points 505 to 507.

The customer 100 has a unique ID 001 and the customer 200 has a unique ID 002. When receiving a registration request from a transit exchange 510, the access point 501 registers the customer code, for instance, the unique ID 001 into a customer code database 311, the telephone number assigned to the customer 100 into the telephone number database 313, and the IP address of the certification request destination into the IP database 312, respectively. The customer code is the information to identify the fact that the customer is one with whom the carrier side made a contract.

When the registration is completed normally, the access point 501 replies the registration success to the IP transit exchange 510. Similarly, telephone numbers and IP addresses corresponding to the unique ID 001 are registered also into the access points 502 to 504.

Even if three or more customers are present on the same IP network, adding different customer codes makes it possible to manage the customers individually. The foregoing pre-registration may be conducted by using a network management system (NMS) 520 installed to manage the plurality of sets of the network equipment.

<Second Procedure>

In the second procedure, the access point, in which the information on the customer code and the IP address of certification acting device, etc., is correctly registered through the first procedure, conducts the certification processing to and from the IP transit exchange. External telephone call becomes possible only from the mobile IP terminal accommodated in the equipment the certification of which has succeeded.

Figure 6:
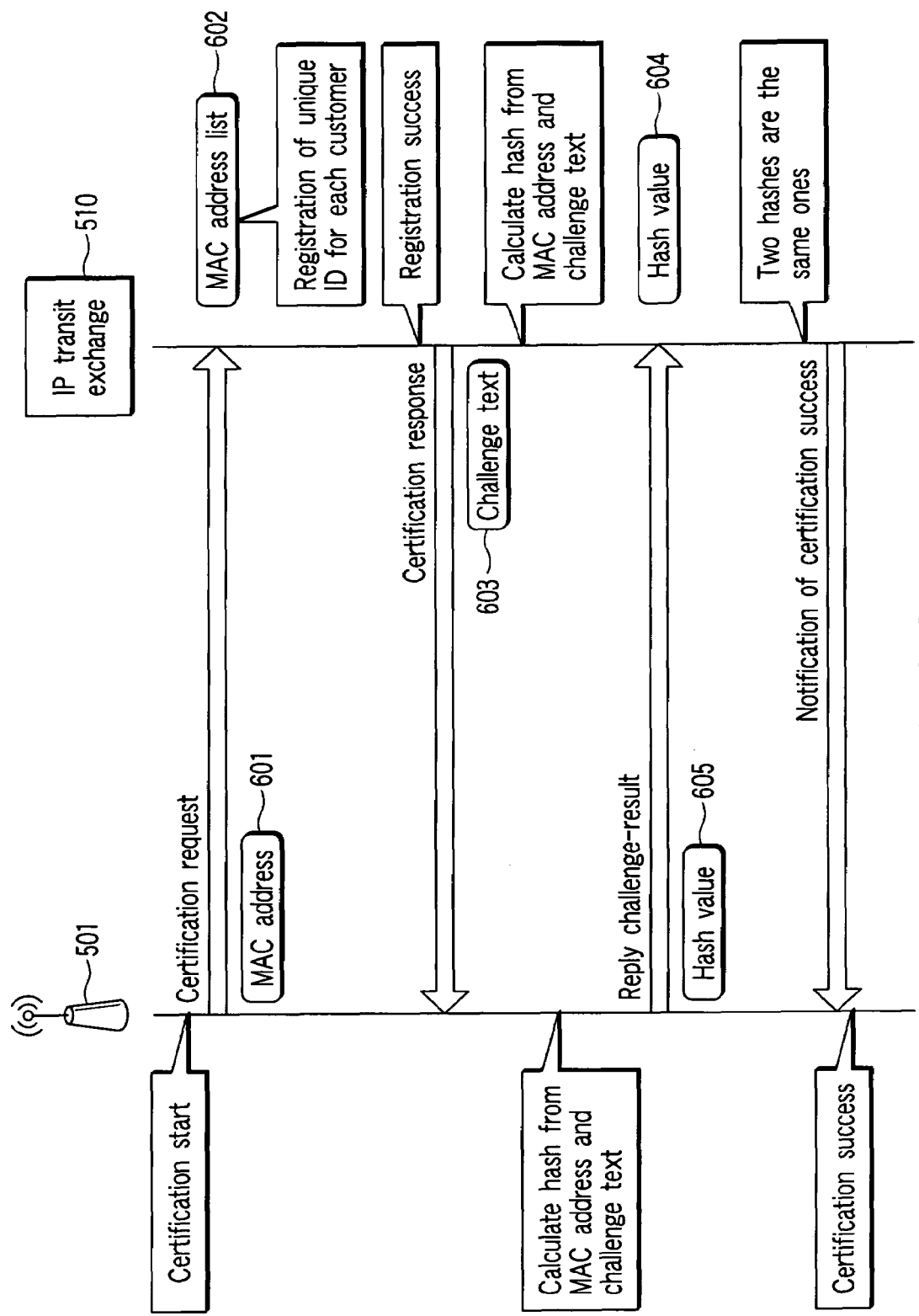
FIG. 6 is an exemplary sequence view depicting a second procedure in the first embodiment of the invention.

FIG. 6 is a sequence view showing the second procedure. It is supposed that the access point 501 completes the registration successfully and the fact is registered correctly in the first procedure. The access point 501 then conducts certification processing to and from the IP transit exchange 510 by using, for example, a challenge-response system.

In this system, a client includes a password in an arbitrary character sequence (challenge-text) shown in advance from a server, a terminal extracts a checksum value called "message digest" through an MD 5 algorithm, and the terminal transmits it to the server. The server also certificates in a similar manner. If the "message digests" are equal to each other, the server recognizes the fact as evidence that the client knows the correct password and gives the certification. That is the rough outline of the challenge-response system.

In this system, the password itself not flowing out onto the network, its security becomes high. As to the certification conducted between the access point and the IP transit exchange, no special restriction is required if both of them mutually fulfilled for the terms of an agreement. For example, a password authentication protocol (PAP) may be useful and an MD 4 algorithm and an SHA-1 algorithm for a hash function in the challenge-response system may be also useful as an access certification protocol.

The access point 501 has a unique ID to identify an individual. The IP transit exchange 510 mounts a unique ID database 621 to record the unique ID of each access point. In the embodiment, MAC addresses must be owned by all sets of IP communication equipment are used as the unique ID. The MAC address 601 of the access point 501 becomes a unique ID.

The access point 501 transmits a certification start request to the IP transit exchange 510. The IP frame received by the IP transit exchange 510 includes a MAC address 601 of the access point 501 of the transmission origin of the certification start request. The IP transit exchange compares this information to a MAC address list 602 in the unique ID database 361 stored by the IP transit exchange. Depending on the result IP transit exchange responds to the certification start request from the access point 501.

When any MAC address not registered in the MAC address list 602, "failure" is returned as a status code. When the MAC address registered in the MAC address list 602, the challenge-text is returned together with the status code "successful". Accordingly, the response to the IP frame including the MC address 601 is "successful" including a challenge-text 603. The challenge-text 603 uses the a hash value generated by setting the MAC address 601 of the access point 501 included in the IP frame, as a seed and by using an MD 5 (message digest algorithm 5) as a hash function.

The access point 501 which has received the challenge-text 603 calculates the hash value for the challenge-text 603 by the use of its own MAC address 601 to transmit the hash value 605 to the IP transit exchange again as a challenge-result.

The IP transit exchange 510 calculates the hash value for the challenge-text by using the MAC address 601 of the access point 501 also by oneself to store the hash value 604 as challenge-base.

When receiving the challenge-result (including the hash value 605), the IP transit exchange 510 compares between the challenge-result and the challenge-base (including the hash value 604) transmitted from the access point.

If the compared hash values 604 and 605 coincide with each other, the IP transit exchange 510 notifies the success of the certification to the access point 501. Further, the IP transit exchange 510 registers the MAC address 601 that is the unique ID of the access point 501 into its own certificated access point list 362.

In the certification in the second procedure, if any access point transmits the certification start request by using the ID not registered on the unique ID database in the IP transit exchange, the certification of the access point is not be completed successfully.

In the case of failure of the certification, furthermore, setting the limit of the frequencies of the certification requests possible to retry from the access point makes it possible not to perform request responses beyond necessity. Thereby, useless communication from the not registered access points can be reduced.

<Third Procedure>

The third procedure connects the mobile IP terminal to the access point. It is assumed that the access point through which the mobile IP terminal passes has been certificated to the IP transit exchange in the second procedure.

Figure 7:
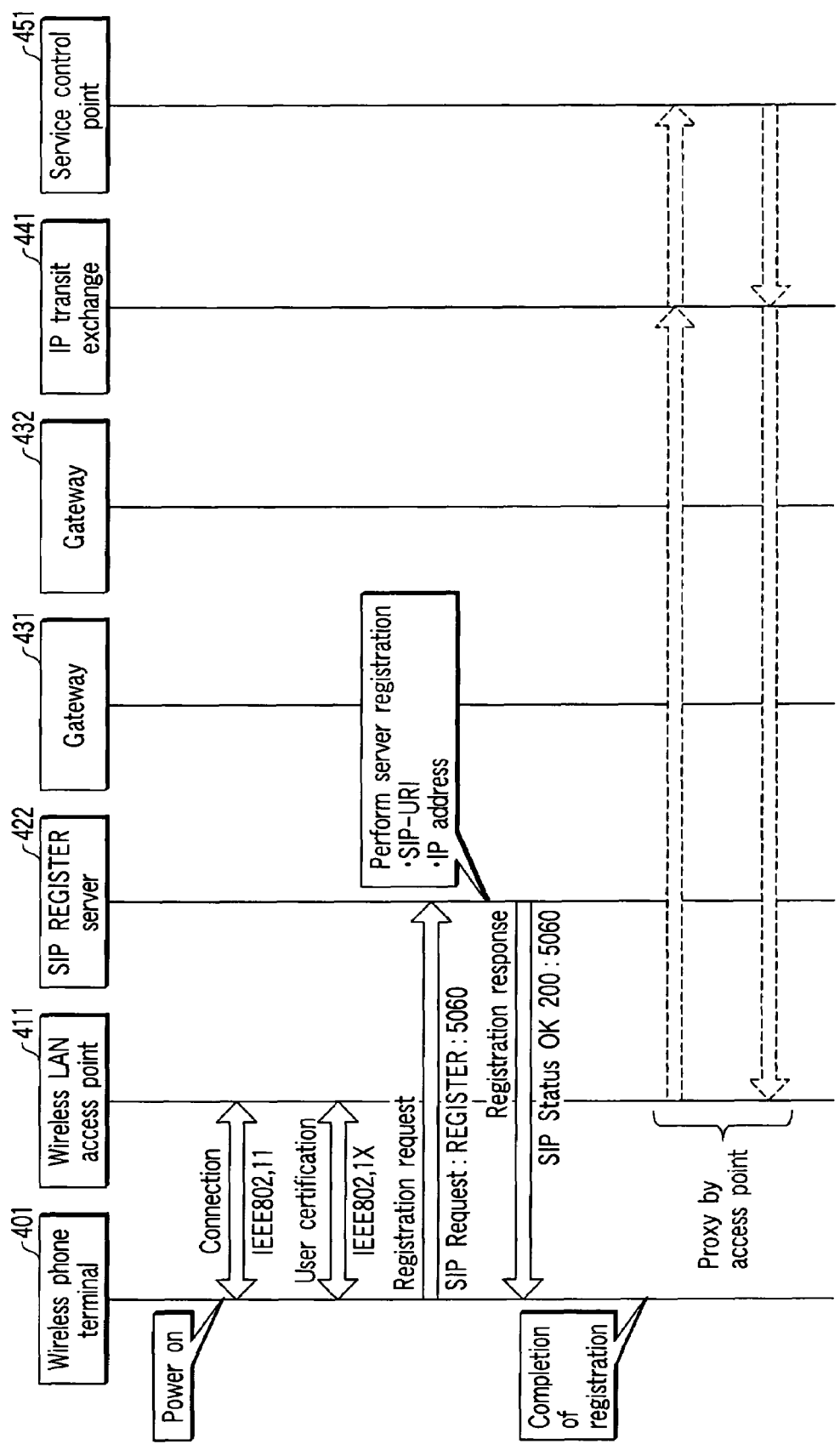
FIG. 7 is an exemplary sequence view depicting a third procedure in the first embodiment of the invention.

FIG. 7 is a sequence view showing a illustrating the connection response of the mobile IP terminal to the access point which is made from the mobile IP terminal after the power-on thereof. The mobile IP terminal 401 connects to the access point 411 in accordance with IEEE 802.11, and then, performs user certification through IEEE 802.1X that is a user certification system in a LAN. After that, the mobile IP terminal 401 issues a registration request to the SIP REGISTER server 422 (or SIP PROXY server 421) at a logical port number 5060 of a UDP.

The SIP REGISTER server 422 registers the SIP-URI being in an address form in specifying a communication partner through the SIP by associating with at least the IP address of the mobile IP terminal 401. After completing the registration, the SIP REGISTER server 422 uses the same UDP to transmit "200 OK" that is a status expressing "OK" of the SIP to the mobile IP terminal 401.

In registration, other than the registration processing of the IP address, access position registration processing of the mobile IP terminal 401 and also telephone number (subscriber's number) registration processing of the mobile terminal 401 are implemented. Thereby, the third procedure becomes possible to specify the mobile IP terminal not only by the IP address but also the position information or the telephone number. In certifying the user, the procedure may execute AES encrypting which has been set in accordance with the security policy in the office.

According to the forgoing procedures, when the connection is completed, on terminating and originating a telephone call at the mobile IP terminal 401, on behalf of the communication terminal, the access point 411 stands in for the terminal certification processing and registration processing to the IP transit exchange 441. Thereby, the mobile IP terminal becomes possible to make an external telephone call.

Figure 8:
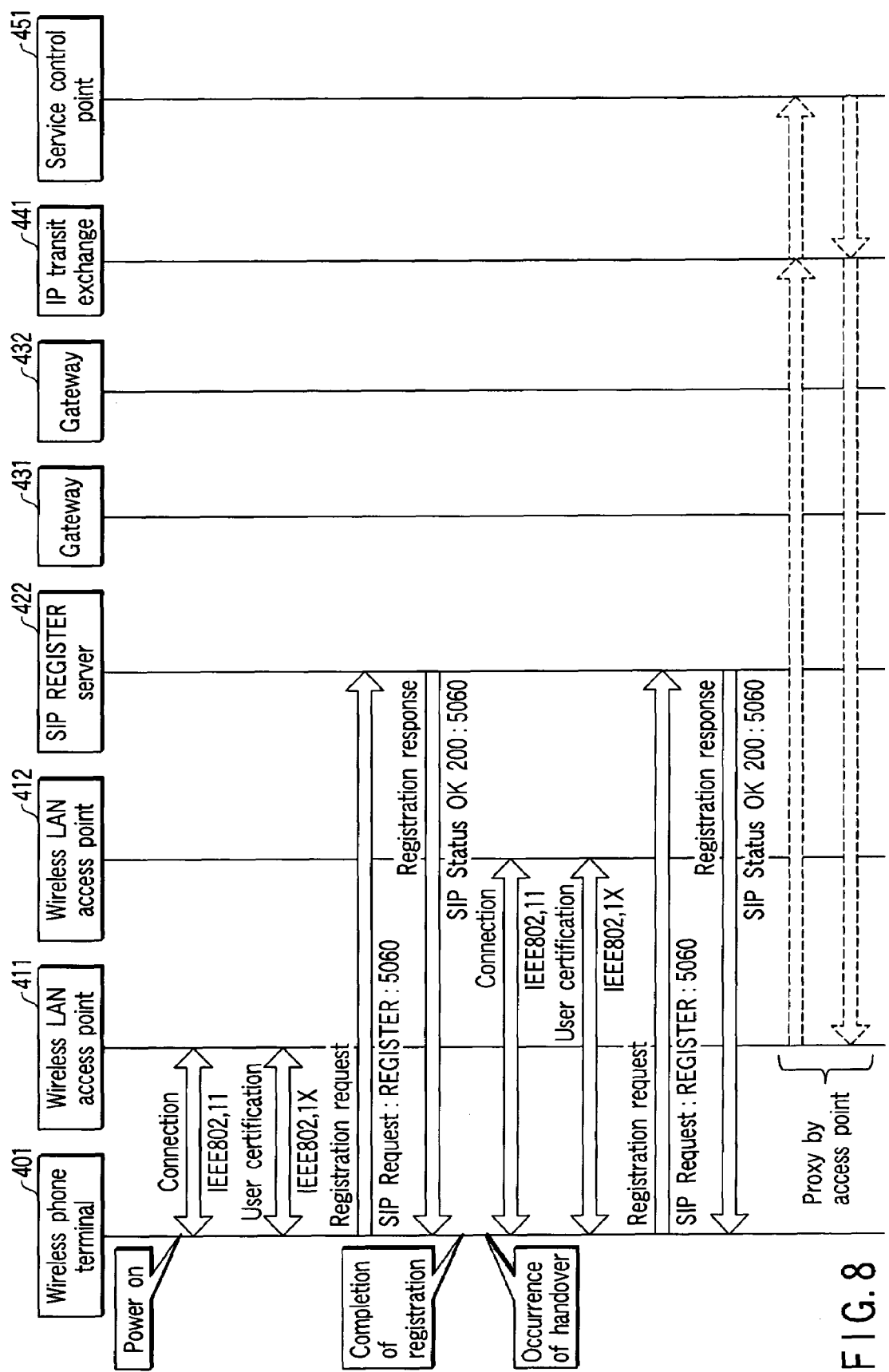
FIG. 8 is an exemplary sequence view depicting processing at the time of handover in the third procedure in the first embodiment of the invention.

FIG. 8 is a sequence view in the case in which the mobile IP terminal 401 deviates from an effective range of the access point 411 and shifts to an effective range of different access point 412. That is, FIG. 8 is a sequence view showing the state until the mobile IP terminal 401 becomes connection-completed state through handover.

The mobile IP terminal 401 performs connection and registration processing to a wireless access point 412 in a similar manner which has performed to the wireless access point 411. The re-connection and re-registration processing allows the wireless access point to execute vicarious certification after the handover.

Other than the time of the power-on or the handover, the mobile IP terminal 401 may periodically execute the re-registration processing of the mobile IP terminal. Thereby, the mobile IP terminal 401 can abandon the information of the mobile IP terminal being not used (terminal in a state of shift un-effective zone, or a state of power-off, etc,) and update the registered information of the registered terminal.

To use the mobile IP terminal for the use of the extension communication in the office, after performing the certification processing of the mobile IP terminal, the registration thereof is executed in the use of the SIP that is a standard protocol. Also the mobile IP terminal side separately performs registration processing according to SIP rules in concert with the setting of the SIP (proxy/register) server in the office. The IP transit exchange at an outside line connection destination is specified in advance for the intra-office SIP server. If the intra-office SIP server is not used for the use of intra-office extension communication, in other words, if the SIP server in the office does not exist, the mobile IP terminal registers the IP transit exchange as the SIP server.

<Fourth Procedure>

In the fourth procedure, the access point performs terminal certification processing to the IP transit exchange on behalf of the mobile IP terminal. Completing the forth procedure that is the last procedure allows the telephone call between the mobile IP terminal and a line terminal. When the mobile IP terminal originates a call or receives an incoming call from the line terminal, a part of the sequence being different, the processing at the time of originating a call will be described firstly.

Figure 9:
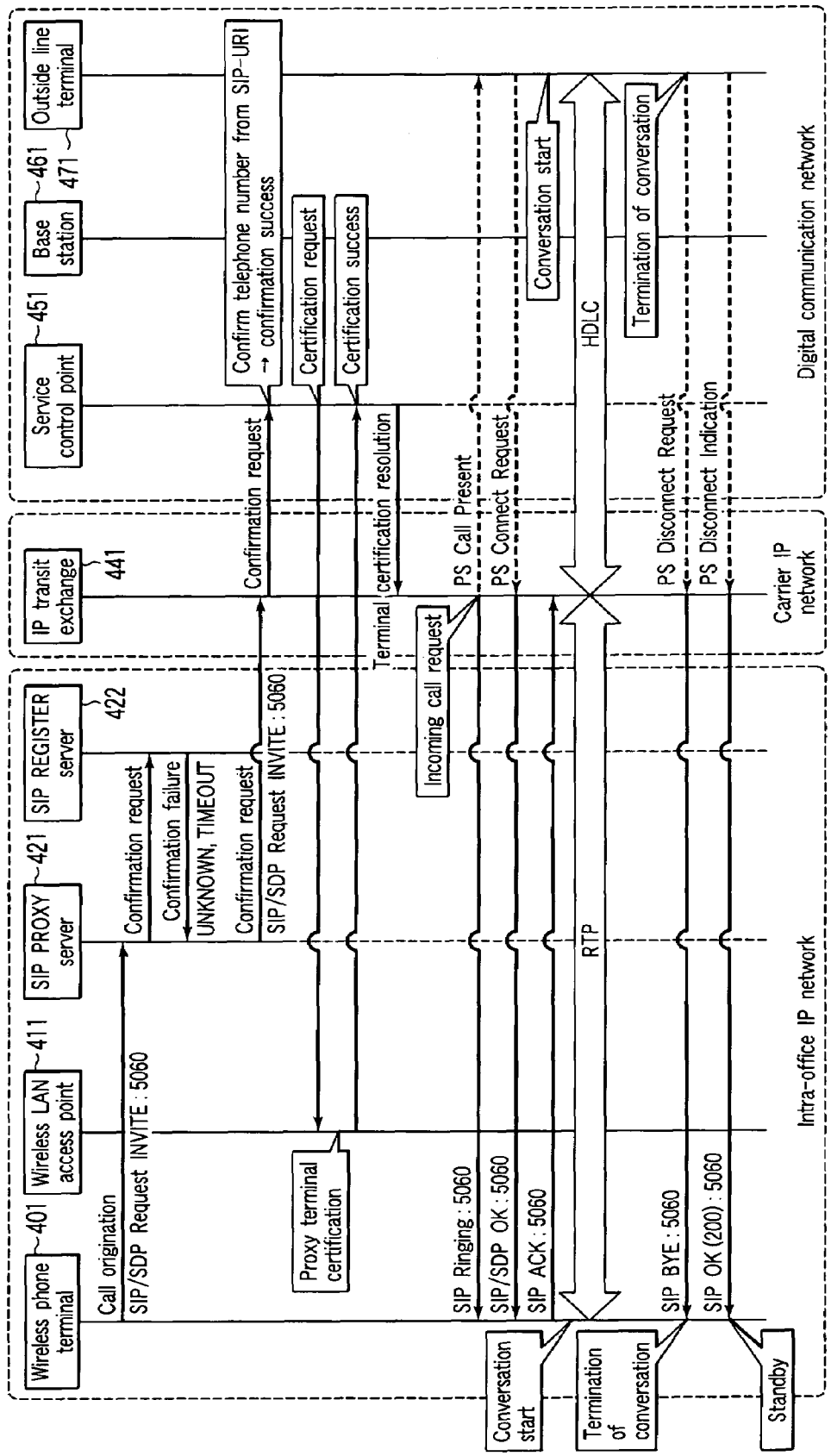
FIG. 9 is an exemplary sequence view depicting processing when a call originates in a fourth procedure in the first embodiment of the invention.

FIG. 9 is a sequence view showing at the time when the phone terminal originates the call. The mobile IP terminal 401 specifies the telephone number of the telephone call destination, and transmits the originating call in response to an INVITE request (request) through the SIP to the SIP PROXY server 421. When receiving the request, the SIP PROXY server 421 transmits a confirmation request including the specified telephone number of the telephone call destination to the SIP REGISTER server 422. The SIP REGISTER server 422 which has received the confirmation request confirms the phone number from the registered SIP-URI. This telephone number being an outside line phone number, a phone terminal with the relevant phone number does not exist on a customer's private network. Therefore, the SIP REGISTER server 422 returns UNKOWN/TIMEOUT to the SIP PROXY server 421. Upon receiving the fact that the telephone call destination is unknown one through an extension, the SIP POXY server 421 then transmits the INVITE request again to the IP transit exchange 441.

If other mobile IP terminals do not exist on the customer's private network, the procedure given above is omitted, and the mobile IP terminal directly transmits the INVITE request to the IP transit exchange.

The IP terminal exchange 441 which has received the INVITE request transmits a solution request to a service control point 451 that is a service control station of the carrier so as to search a base station directly accommodating the outside line terminal. The service control point 451 which has received the solution request confirms the position of an outside line terminal 471 to return the terminal certification request of the mobile IP terminal that is a call origin.

When receiving the terminal certification request from the service control point 451, the IP transit exchange 441 converts terminal certification request data into an IP frame, and returns it toward the network on the side of the mobile IP terminal 401.

When receiving the request data addressed to the mobile IP terminal 401, the access point 411 determines its IP frame to make a response to the terminal certification request on behalf of the mobile IP terminal 401 without transiting it to the side of the mobile IP terminal 401. The use equipment having been registered, and the access point itself having held the data of the mobile IP terminal 401, the access point 411 responds to the network on the carrier side in the user of the unique ID of the mobile IP terminal 401 of the call origin.

If the mobile IP terminal 401 has not been refused its certification by the carrier (due to nonpayment of charge, etc.), the service control point 451 which has received the result of the terminal certification from the access point 411 performs the certification then transmits the resolution result to the IP transit exchange 441. The IP transit exchange 441 which has received the solution result starts the telephone call through the SIP in the same way as that of the conventional procedure. That is, the IP transit exchange 441 transmits a call reception request to the outside line terminal 471 of the telephone call partner, and transmits an STP-ringing request to the mobile IP terminal 401.

When a telephone call is started through the SIP, the IP transit exchange 441 and the outside line terminal 471 transmit and receive voice data therebetween in an HDLC system equivalent to a data link layer. The IP transit exchange 441 and the mobile IP terminal 401 transmit and receive voice data therebetween through an RTP equivalent to a transport layer. On disconnecting the telephone call, a PS disconnect request and an SIP-BYE are made to the outside line terminal 471 and the mobile IP terminal 401, respectively, to terminate the telephone call. The sequence of the call origination is given above.

Figure 10:
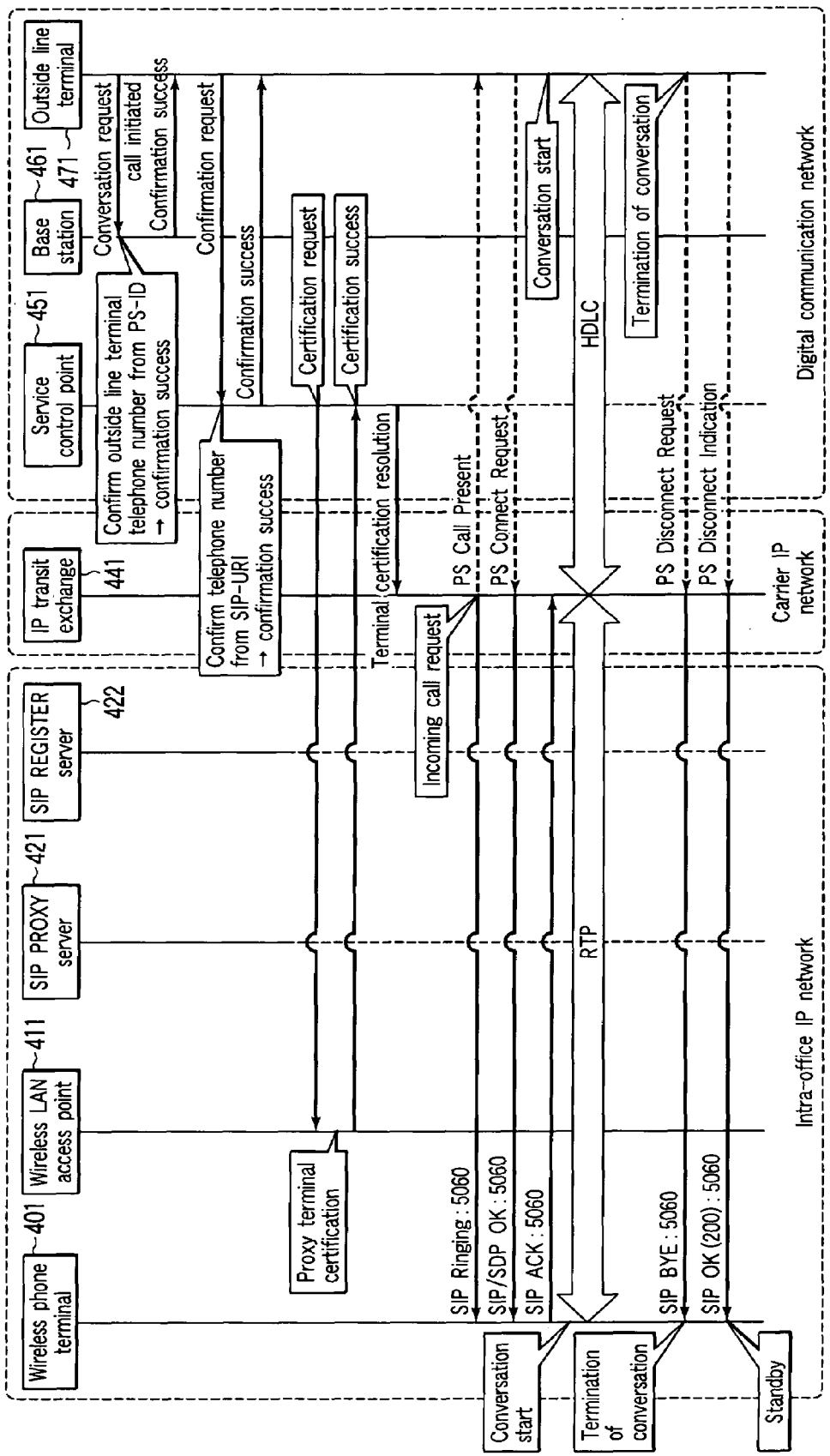
FIG. 10 is an exemplary sequence view depicting processing when a call comes in the fourth procedure in the first embodiment of the invention.

FIG. 10 shows a sequence of an incoming call, which is not different from FIG. 9 in a part in which the certification proxy is performed by a LAN access point, although the procedures in relation to the incoming call from the outside line terminal 471 are different from each other.

When being connected to a base station 461 at first, the outside line terminal 471 then transmits "call initiated" that is a request for a telephone call to the mobile IP terminal 401 to the base station 461. The base station 461 confirms that the telephone call destination is not other outside line terminals belonging to the base station 461 to transmit the confirmation result to the outside line terminal 471.

When receiving the result, the outside line terminal 471 freshly issues a resolution request to the service control point 451. The control point 451 confirms the position (IP address, etc.) of the mobile IP terminal 401 on the IP network from the SIP-URI of the mobile IP terminal 401 that is the telephone call destination. The control point 451 transmits the terminal certification request of the mobile IP terminal 401 that is the incoming call destination to the IP transit exchange 441. The procedure after the terminal certification is the same as that of the call origination, and after transmitting and receiving the terminal certification result, this procedure starts and terminates the telephone call through the SIP in the same manner as conventional procedure.

Second Embodiment

In a second embodiment, the case in which a plurality of IP transit exchanges are present, and the IP transit exchanges mutually make communication and also collect information on charging. The network configuration of the second embodiment is the same as that of FIG. 4 and its explanation will be eliminated.

In a network including the IP transit exchanges, a form, like the first embodiment, accommodating the IP phone terminal and the outside line phone terminal like a wireless-phone terminal in the same IP transit exchange, is frequently limited to a small-sized network form. In general, the IP transit exchanges of separated two sets in total are frequently installed on a side of accommodating the IP phone terminal and on a side of accommodating the outside line phone terminal, respectively. The network including the plurality of IP transit exchanges needs a function of transiting voice data among the IP transit exchanges.

The certification processing function by the IP transit exchange performs an important part in the present invention. On the other hand, if call origination and call reception are established as a result of certification, and when voice communication of end-to-end is started, the IP transit exchange plays only a part as a function of converting and transiting the voice data regardless of the result of the certification.

The processing of converting and transiting the voice data in a carrier's network between an IP network and an ISDN network differing in the format of the voice data causes an increase in costs. To execute charging resulted from a measurement of conversation time so as to burden the cost to a user; management and control of the voice data in a private IP network operated by the carrier are needed. Therefore, such a network including the plurality of IP transit exchanges needs not only to transit the voice data but also manage and control it.

FIG. 11 is a sequence view showing a transit method for treating voice data of end-to-end among the IP transit exchanges when the mobile IP terminal originates a call. The processing in regard to the call origination and the certification of the terminal being the same as the first embodiment, its explanation will be omitted. To transit the voice data through the RTP from the IP transit exchange 441 to another IP transit exchange 442 placed on the IP network, this embodiment converts the voice data into an IP that is a protocol in a network layer. The RTP is a protocol in a transport layer treated between the mobile IP terminal 401 and the IP transit exchange 441.

The voice data converted into IP data includes information on the outside line terminal 471 of the telephone call destination. When receiving the converted voice data, the IP transit exchange 442 accommodating the outside line terminal 471 further converts the voice data (IP data) into the data in an HDLC system that is a protocol in a data link layer to transmit it to the outside line terminal 471. The outside line terminal 471 makes communication with the mobile IP terminal 401 through the same conversion processing as that of the transmission from the IP transit exchange 442. In the case of this embodiment, the conversion processing of the voice data becomes complex because the conversion processing further increases by one stage, and a delay possibly occurs. However, the conversion processing being executed for each IP transit exchange, there is an advantage such that each IP transit exchange can determine processing time and easily manage and control the voice data. Centralized management of recorded processing times at a service control point 451, etc., enables measuring each conversation elapsed time.

Without converting the voice data into the IP form, direct transition of the voice data in end-to-end is acceptable. Such a case will be described with reference to FIG. 12.

Figure 12:
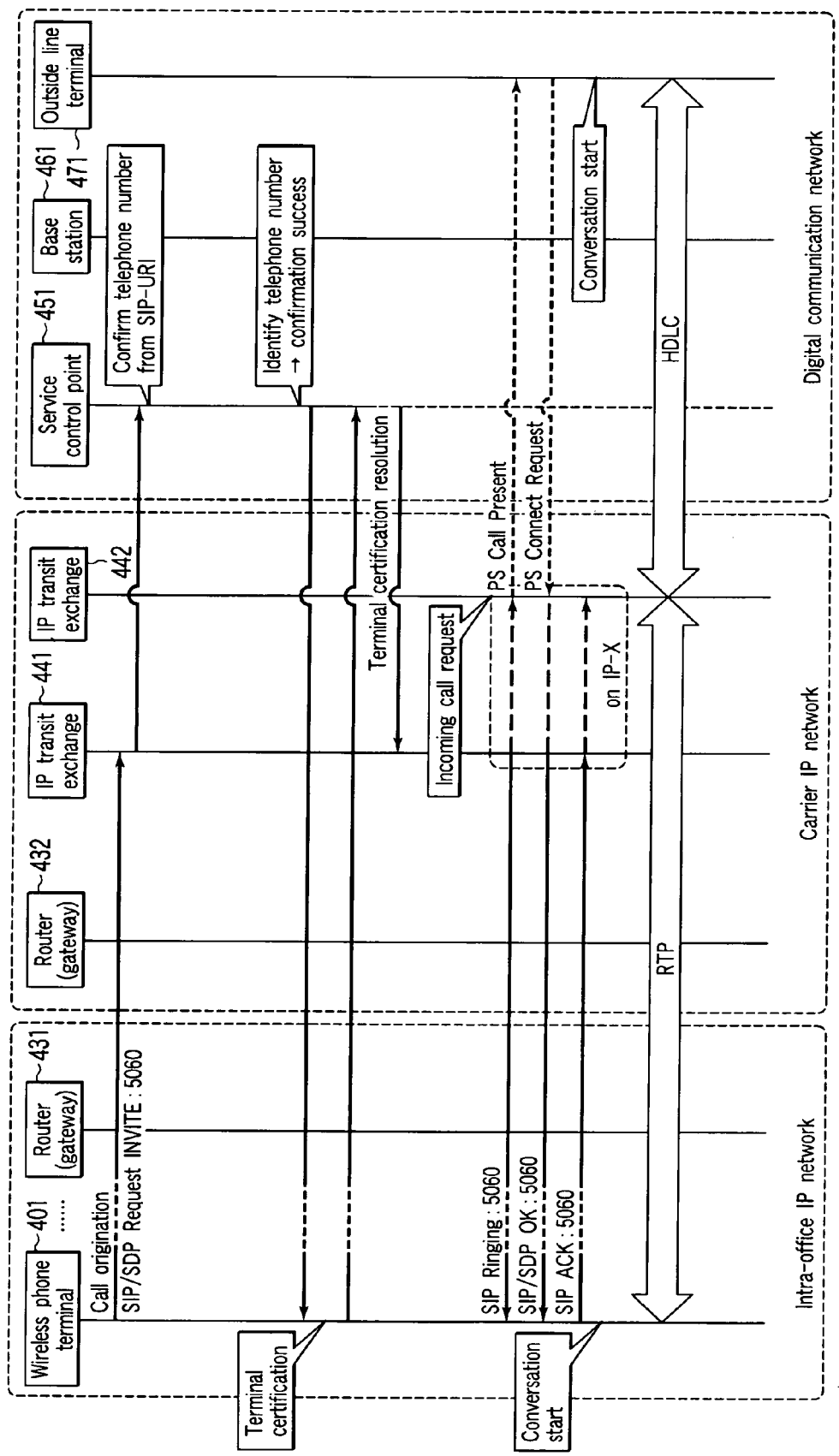
FIG. 12 is an exemplary sequence view depicting a transit method in which an IP phone terminal directly transmits voice data up to an IP transit exchange accommodating an outside line terminal in the second embodiment of the invention.

FIG. 12 is a sequence view showing a transit method in which the IP phone terminal directly transmits the voice data to the IP transit exchange accommodating the outside line terminal. In FIG. 12, at first, the transit method takes over the management and control of the mobile IP terminal 401 from the IP transit exchange 441 to the IP transit exchange 442 on the accommodating side of the outside line terminal. The IP transit exchange 442 with the outside line terminal 471 accommodated therein, then, transmits and receives the voice data depending on the RTP to and from the mobile IP terminal 401 in the transport layer.

The IP transit exchange 442 transmits and receives the voice data in the use of the HDLC system to and from the outside line terminal 471. After handover of conversation, the IP transit exchange 442 on the side of accommodating the outside line terminal 471 transmits the conversation elapsed time to an origin of the handover. In this case, a process of handover processing between equipment having been added, the frequency of the conversion processing is less in comparison with the procedure in FIG. 11. Therefore, the transit method may restrict the delay of the voice data as much as possible to keep the quality of the telephone call. To determine which transit method should be used, the size of the scale of the network, the required quality of the telephone call, and the like, may appropriately selected as a determination reference.

Figure 13:
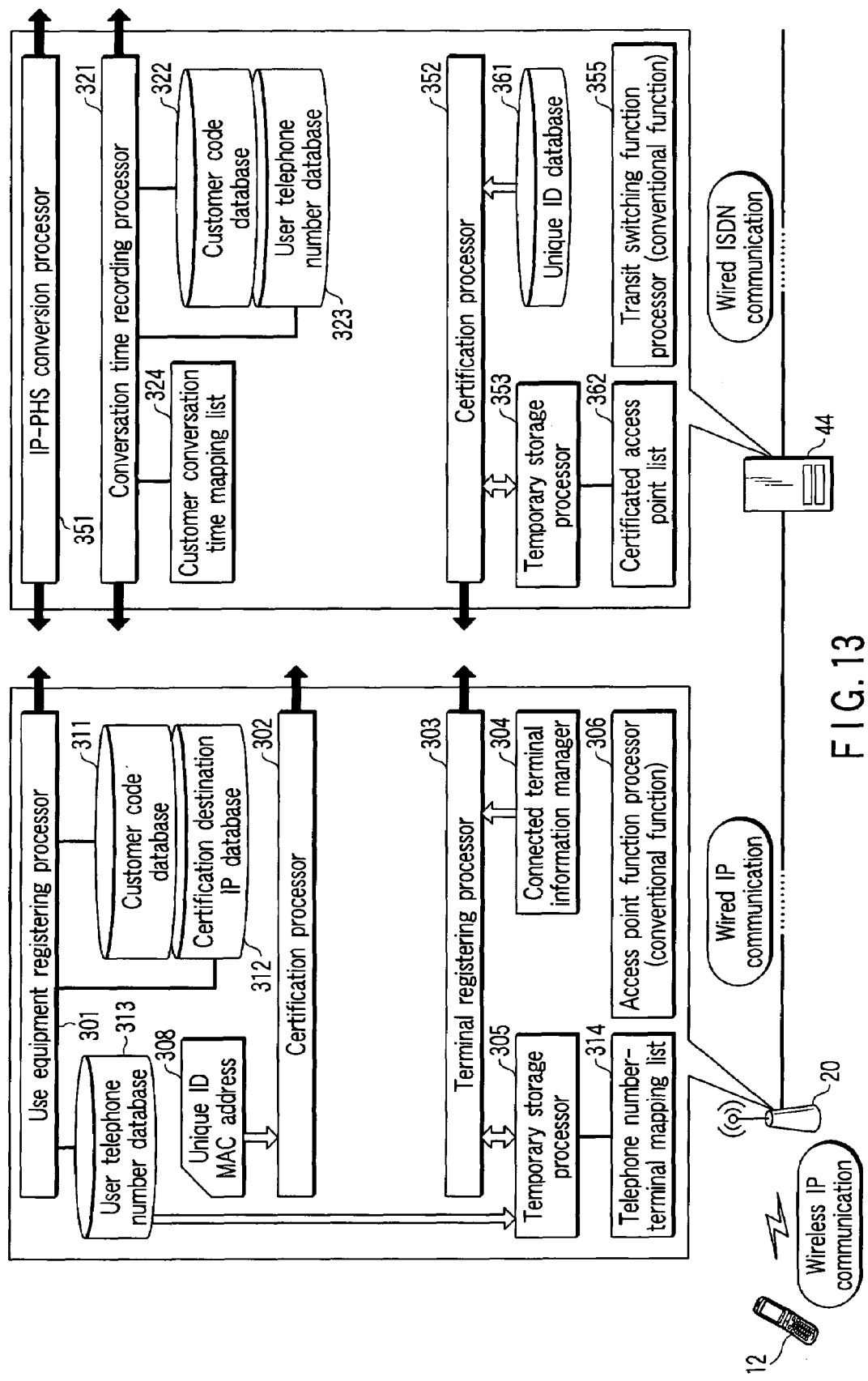
FIG. 13 is an exemplary functional block diagram depicting an access point and a transit exchange in the second example of the invention.

FIG. 13 is a functional block diagram showing the access point and the transit exchange in the second embodiment. FIG. 13 illustrates relationships inner processors to measure the conversation time and to charge the fee to the customer. As compared with the inner processors in the first embodiment, a conversation time recorder 321 is added to the IP transit exchange 44. Further, a customer code database 322, a use telephone number database 323, and a customer-conversation time mapping list 324 are added to the IP transit exchange 44.

On stating the voice communication, the conversion time recorder 321 acquires customer information from the telephone number of a call origination source by using the customer code database 322 and the use telephone number database 323. The acquired customer information is registered the customer-conversation time mapping list 324 using a user telephone number as a key. Upon terminating the voice conversation, the conversation time recorder 321 cumulatively adds the conversation transit time through time stamp to the conversation time to record the total conversation time into the mapping list 324.

If the transit method shown in FIG. 12 is adopted, the processor (not shown) conducting handover among the IP transit exchanges performs handover processing and transmission of the conversation transit time to the transition origin. Like this manner, the conversation time is measured by the matching between each phone terminal and the used user identifiers, and by measuring transit use periods.

At least any one of the carrier IP network 103 and the public switched telephone network 104 is a network based on a charging system, and the carrier IP network 103 among them includes a measurement processing unit measuring the time in which a communication link has been formed and a charge control device charging to at least any one of the phone terminals regarding the communication link in response to the measured time. The function of the measurement processing unit is mainly accomplished by the conversation time recorder 321. The function of the charge control device is achieved by the certification server 40, IP transit exchanges 41 and 44, or a charging server (not shown).

Third Embodiment

In the third embodiment, the case that is configured so as to increase security by adding a function, such as an incoming call rejection will be described. Therefore, this embodiment further implements the processing so that the IP transit exchange certificates the access point. The system configuration of the third embodiment being the same as that of FIG. 4, its explanation will be eliminated.

In the third embodiment, it is supposed that the voice communication is only performed from the mobile IP terminal, etc., through the access point. In this case, the SIP-INVITE message that is a start request for a call origination sequence from the (wireless) IP phone terminal always transits the access point. There, the access point monitors a logical port (port number 5060 in standard) through which the SIP message transits, certificates to and from the IP transit exchange for each call origination, and then, conducts transit processing if the certification is "OK".

Figure 14:
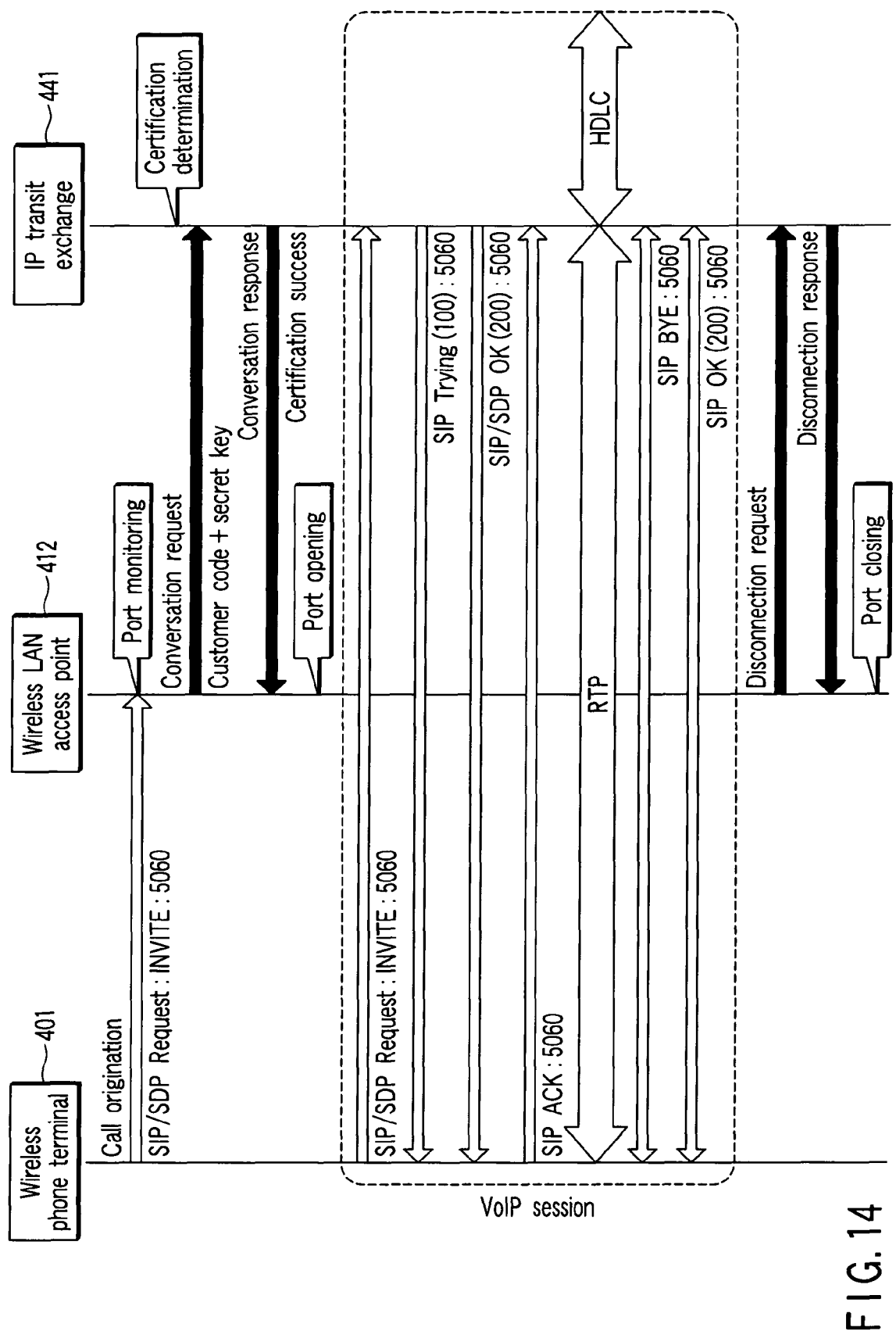
FIG. 14 is an exemplary sequence view depicting a connection processing procedure including certification of an access point itself to an IP transit exchange in a third embodiment of the invention.

FIG. 14 is a sequence view showing a connection processing procedure including the certification of the access point 412 itself to the IP transit exchange 441 in the third embodiment. In the procedure until the conversation is started, the same goes up to the third procedure. The access point 412 has been certificated by the carrier side. The IP transit exchange only accepts the call origination request passing through the certificated access point.

In the third embodiment, in waiting for an originating call and an incoming call, the logical port of the access point 412 and the logical port of the IP transit exchange 441 through which the SIP message transits are in a closed state. From this closed state, when an originating call is made from the mobile IP terminal 401, the access point 412 being in monitoring drops the SIP-INVITE request from the mobile IP terminal 401 at the logical port number 5060.

The access point 412 does not transit the SIP-INVITE request at this point of time, and starts the certification to and from the IP transit exchange 441 as it is. The logical port at this point of time has been still closed. Therefore, the access point 412 transmits a pair of a secret key and an item of certification information by means of a point-to-point tunneling protocol (PPTP) that is a protocol to establish a virtual communication line on the network. As for the certification information, a plurality of combinations of a customer code, IP address of the mobile IP terminal 401 and MAC address of the mobile IP terminal 401, etc., to be registered in the access point 412 are used.

The IP transit exchange 441 performs certification processing in use of the certification information, and transmits a certification success message and a session secret key for a reply if the certification is completed successfully. The IP transit exchange 441 holds the certification information to discriminate between the certificated access point 412 and the other access points.

When receiving the certification success, the access point 412 opens the logical port to start the transition of the SIP-INVITE request from the mobile IP terminal 401 having been on standby. The IP transit terminal 441 compares the certification information acquired in advance to the IP address and the MAC address of the IP phone terminal included in the SIP INVITE request transmitted from the access point 412, and if the transmission is made from the certificated access point, it accepts the call origination request.

The VoIp session through the SIP after opening the logical port is the same as that of the first embodiment. When the VoIP session is terminated, the logical port is closed and the state of the telephone system returns to a standby state.

In the third embodiment, the certification having performed in two stages, the certification strength can be enhanced. Moreover, the access point can refuse the call arrival and the call reception for all IP phone terminals which have been registered at the access point.

The third embodiment 3 can expand a function to refuse the call arrival and the call reception in the terminal certification of the IP phone terminal by using the SIP-SPD system including a session description protocol (SDP) controlling a multimedia session and by embedding caller information at an SDP section.

Figure 15:
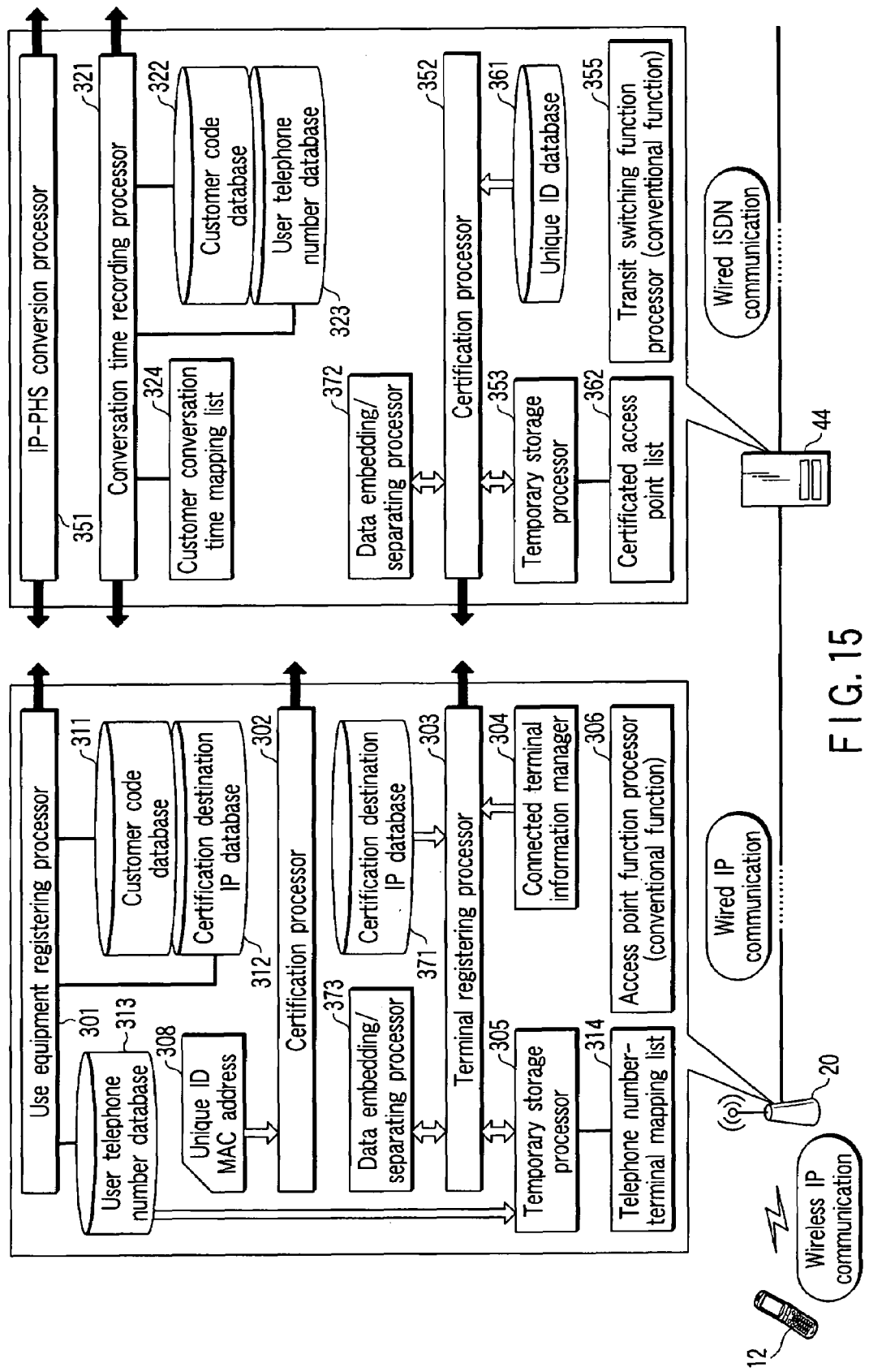
FIG. 15 is an exemplary functional block diagram depicting an access point and a transit exchange in the third embodiment of the invention

FIG. 15 is a view showing another example of a functional block diagram illustrating the access point and the transit exchange in the third embodiment 3. FIG. 15 depicts a function processor added in regard to the embedding the caller information. In FIG. 15, in addition to the case of FIG. 13, a conversation refusal list database 371 and data embedding/separating processors 372 and 373 are further added.

As to the refusal list database 371 disposed at the access point, at least one of telephone number, IP address, or code by country to refuse a conversation is formed as a table associated for each mobile IP terminal. This table includes two tables. One of them is a table which is held in the SIP server connected to the intra-office IP network and is integrally written like a junk call list. The other is a table which is transmitted from the mobile IP terminal, is written by updating the refusal list database, and is individually set at each mobile IP terminal when the mobile IP terminal is connected to the access point in the third procedure mentioned in the first embodiment.

In the system of FIG. 15, in incoming a call, when the access point 20 conducts the terminal certification processing, the system uses the SIP/SDP system to include the telephone number request of the outside line phone terminal on the caller side in the SDP section. The IP transit exchange 44 separates the data in the SDP section and requires the telephone number of the outside phone terminal to the service control point. If the outside line phone terminal has not being brought into a non-notification setting, etc., the service control point transmits the telephone number. Access point 20 which has received this telephone number confirms that this telephone number is not present in the refusal list database 371 in processing the terminal certification, then, conducts usual terminal certification processing. If this telephone number has been present in the refusal list database 371 or the telephone number has been failed to be received, the access point 20 notifies the fact of certification failure to the service control point.

Even after the success of the certification, the access point 20 notifies the telephone number to the mobile IP terminal to display the telephone number on a display unit of the mobile IP terminal, then, the access point can provide information to determine whether or not the telephone call should be received before starting a conversation. On incoming a call, the access point 20 can describe the identifiers of not only the SIP-URI and telephone number, but also of the code by country and domain of the IP transit exchange into the SDP section, and can refuse the call reception and display the identifiers on the display unit.

The present invention is not limited to the configurations in each of the aforementioned embodiment. For instance, the mobile IP terminal 12 in FIG. 1 may be replaced by a wired IP phone terminal, and in a similar way, the access point 20 may be replaced by a router. In this case, the router has a functional block other than the access point function processor 306 among the function blocks of the access point 20. As for the outside line phone, not only the wireless-phone terminal but also, for example, a mobile phone terminal using a CDMA/GSM system may be usable. In such a case, the protocol changer 351 in FIG. 3 may be replaced by the protocol conversion processor between the CDMA/GAS system and the IP.

As mentioned above, the present invention enables network equipment to perform terminal certification proxy processing. Thereby, it becomes possible to construct a telephone system enabling the conversation between the IP phone terminal and the outside line pone terminal without having to apply a large-sized change in both the IP network and the line network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A telephone system, comprising:
    a first phone terminal belonging to a private communication network;
    a second phone terminal belonging to a public communication network;
    a transit device which connects the private communication network to the public communication network; and
    a call control device which controls a call between the first phone terminal and the second phone terminal, wherein
    the private communication network includes:
        network equipment;
        a first certification processing unit which is disposed in the network equipment and performs certification proxy processing to certificate whether or not the first phone terminal should be connected to the public communication network; and
        a notification processing unit which notifies the result of the certification proxy processing to the call control device when a call connection request to form a communication link between the first phone terminal and the second phone terminal occurs,
    the public communication network includes a second certification processing unit which performs certification processing of the network equipment, and
    the call control device forms the communication link in response to the call connection request if the notified result of the certification proxy processing shows a success and the certification processing of the network equipment shows a success.

2. The telephone system according to claim 1, wherein
    the first phone terminal is a wireless-phone terminal;
    the private communication network includes an access point which is the network equipment to wirelessly connect the wireless-phone terminal to the private communication network, and
    the access point includes the first certification processing unit and the notification processing unit.

3. The telephone system according to claim 1, wherein
    the transit device is a router which is the network equipment belonging to the private communication network, and
    the router includes the first certification processing unit and the notification processing unit.

4. The telephone system according to claim 1, wherein
    the public communication network comprises:
        a data communication network; and
        a line switched network having a protocol different from that of the data communication network, and
    the call control device includes a function to exchange mutual protocols between the data communication network and the line switched network and to transit voice communication between the public communication network and the data communication network.

5. The telephone system according to claim 1, wherein
    any one of the data communication network and the line switched network is a network of a charging system, and
    the public communication network comprises:
        a measurement processing unit which measures time with the communication link formed therein; and
        a charging control device which charges to at least any one of the first phone terminal and the second phone terminal in response to the measured time.

6. A call control device for use in a telephone system comprised of a private communication network and a public communication network connected to each other; a first phone terminal belonging to the private communication network; and a second phone terminal belonging to the public communication network, wherein the private communication network comprises network equipment; a first certification processing unit which is disposed in the network equipment and performs certification proxy processing so as to confirm whether or not the first phone terminal should be connected to the public communication network; and a notification processing unit which notifies the result of the certification proxy processing when a call connection request to form a communication link between the first phone terminal and the second phone terminal occurs, and wherein the public communication network includes a second certification processing unit which performs certification processing of the network equipment,
    the call control device controlling a call between the first phone terminal and the second phone terminal; and forming the communication link in response to the call connection request if the result of the notified certification proxy processing shows a success and the certification processing of the network equipment shows a success.

7. The call control device according to claim 6, wherein
    the first phone terminal is a wireless-phone terminal,
    the private communication network includes an access point which is the network equipment in order to wirelessly connect the wireless-phone terminal to the private communication network, and
    the access point includes the first certification processing unit and the notification processing unit.

8. The call control device according to claim 6, comprising:
    a function to convert mutual protocols between the data communication network and the line switched network and to transit voice communication between the public communication network and the data communication network, wherein
    the public communication network comprises:
        a data communication network; and
        a line switched network having a protocol different from that of the data communication network.

9. A wireless access device which is provided for a private communication network of a telephone system comprising the private communication network and a public communication network connected to each other, a wireless-phone terminal belonging to the private communication network, a phone terminal belonging to the public communication network, and a call control device controlling a call between the wireless-phone terminal and the phone terminal, the wireless access device comprising:

a connection unit which wirelessly connects the wireless-phone terminal to the private communication network;

a first certification processing unit which performs certification proxy processing to confirm whether or not the wireless-phone terminal should be connected to the public communication network; and a notification processing unit which notifies the result of the certification proxy processing to the call control device when a call connection request to form a communication link between the wireless-phone terminal and the phone terminal occurs, wherein the public communication network includes a second certification processing unit which performs certification processing of the wireless access device, and the call control device forms the communication link in response to the call connection request if the notified result of the certification proxy processing shows a success and the certification processing of the wireless access device shows a success.

10. A transit device which is provided for a telephone system comprising a private communication network and a public communication network connected to each other, a first phone terminal belonging to the private communication network, a second phone terminal belonging to the public phone terminal, and a call control device which controls a call between the first phone terminal and the second phone terminal, and connects the private communication network to the public communication network, the transit device comprising:

network equipment;

a first certification processing unit which performs certification proxy processing to confirm whether or not the first phone terminal should be connected to the public communication network; and a notification processing unit which notifies the result of the certification proxy processing to the call control device when a call connection request to form a communication link between the first phone terminal and the second phone terminal, wherein the public communication network includes a second certification processing unit which performs certification processing of the network equipment; and the call control device forms the communication link in response to the call connection request if the notified result of the certification proxy processing shows a success and the certification processing of the network equipment shows a success.

11. A wireless-phone terminal for use in a telephone system comprising the wireless-phone terminal belonging to a private communication network, a phone terminal belonging to a public communication terminal, and a call control device which controls a call between the wireless-phone terminal and the phone terminal, wherein the private communication network comprises:

network equipment;

a first certification processing unit which is disposed in the network equipment and performs certification proxy processing to confirm whether or not the wireless-phone terminal should be connected to the public communication network;

a notification processing unit which notifies the result of the certification proxy processing to the call control device when a call connection request to form a communication link between the first phone terminal and the second phone terminal occurs, the public communication network includes a second certification processing unit which performs certification processing of the network equipment, and the call control device forms the communication link in response to the call connection request if the result of the certification proxy processing shows a success and the certification processing of the network equipment shows a success.

12. A communication control method which is used for a telephone system and composed of a first phone terminal belonging to a private communication network, a second phone terminal belonging to a public communication network, and a call control device which controls a call between the first phone terminal and the second phone terminal, the communication control method, comprising:

a first certification step of performing, by a certification processing unit disposed in network equipment included in the private communication network, certification proxy processing to confirm whether or not the first phone terminal should be connected to the public communication network;

a notification step of notifying the result of the certification proxy processing when a call connection request to form a communication link between the first phone terminal and the second phone terminal occurs;

a second certification step of performing certification processing of the network equipment; and a link formation step of forming the communication link in response to the call connection request if the notified result of the certification proxy processing shows a success and the certification processing of the network equipment shows a success.

* * * * *